US008315147B2

(12) United States Patent
Hirotsune et al.

(10) Patent No.: US 8,315,147 B2
(45) Date of Patent: Nov. 20, 2012

(54) MULTILAYER OPTICAL RECORDING MEDIUM HAVING THREE OR MORE RECORDING LAYERS WITH REDUCED INTERLAYER CROSSTALK

(75) Inventors: Akemi Hirotsune, Odawara (JP);
Shigeharu Kimura, Yokohama (JP);
Takahiro Kurokawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 396 days.

(21) Appl. No.: 12/420,845

(22) Filed: Apr. 9, 2009

(65) Prior Publication Data

US 2009/0257341 A1  Oct. 15, 2009

(30) Foreign Application Priority Data

Apr. 11, 2008 (JP) ................. 2008-103361

(51) Int. Cl.
*G11B 7/24* (2006.01)
(52) U.S. Cl. .................. 369/275.4; 369/275.1
(58) Field of Classification Search ............. 369/275.1, 369/275.4, 275.2, 275.3, 275.5, 280, 281, 369/283, 285; 428/64.1, 64.4; 430/321, 430/320, 270.11, 270.13; 720/718
See application file for complete search history.

(56) References Cited

U.S. PATENT DOCUMENTS

| 5,614,938 | A | 3/1997 | Sugiyama et al. |
| 2003/0103431 | A1 | 6/2003 | Kuroda |
| 2006/0028971 | A1 | 2/2006 | Mishima et al. |
| 2007/0189147 | A1 | 8/2007 | Miyamoto et al. |

FOREIGN PATENT DOCUMENTS

| EP | 1 205 917 A2 | 5/2002 |
| EP | 1 465 172 A2 | 10/2004 |
| EP | 1 630 793 A2 | 3/2006 |
| JP | 5-101398 A | 4/1993 |
| JP | 2000-11474 | * 1/2000 |
| JP | 2006-48811 A | 2/2006 |
| JP | 2007-220150 A | 8/2007 |
| WO | 2005/036537 A2 | 4/2005 |

OTHER PUBLICATIONS

WO 01/18799 A1, Multilayered Optical Disc, Mamoru Shoji et al, Mar. 15, 2001.*
Shida et al., Multilayer Optical Read-Only-Memory Disk Applicable to Blu-ray Disc Standard Using a Photopolymer Sheet with a Recording Capacity of 100 GB, Japanese Journal of Applied Physics, vol. 43, 7B, 2004, pp. 4983-4986.
Ushiyama et al, Interlayer Cross-talk Reduction by Controlling Backward Reflectivity for Multilayer Disks, Postdeadline Papers, Optical Data Storage (ODS) Topical Meeting and Tabletop Exhibit, Portland, OR, USA, May 20-23, 2007, WDPDP3.pdf.

* cited by examiner

*Primary Examiner* — Tan X Dinh
(74) *Attorney, Agent, or Firm* — Mattingly & Malur, PC

(57) ABSTRACT

In a multilayer optical recording medium having at least three recording layers, an influence of interlayer crosstalk due to unnecessary light is suppressed. Each of the recording layers includes an information recording area, and the recording layers other than the nearest recording layer and the farthest recording layer when viewed from a light incident side include a first annular area having uneven patterns formed thereon, and a second annular area having uneven patterns formed thereon, the first annular area being adjacent to an inner side of the information recording area, the second annular area being adjacent to an outer side of the information recording area.

10 Claims, 17 Drawing Sheets

Readout signal of L4

Readout signal of L3

Readout signal of L4

Readout signal of L3

107

107

107

107

FIG. 16A
FIG. 16B
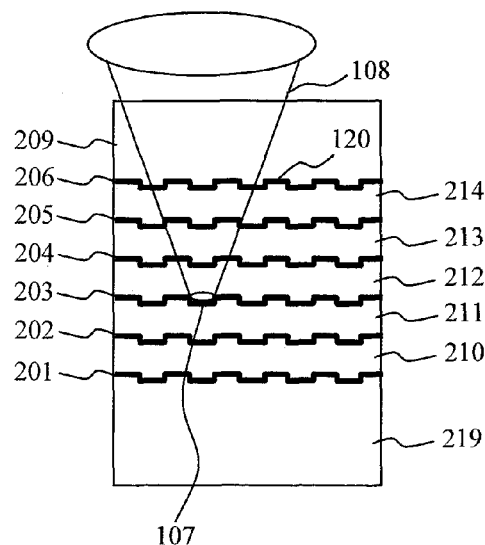
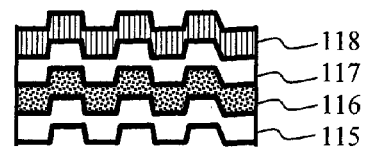
FIG. 16C
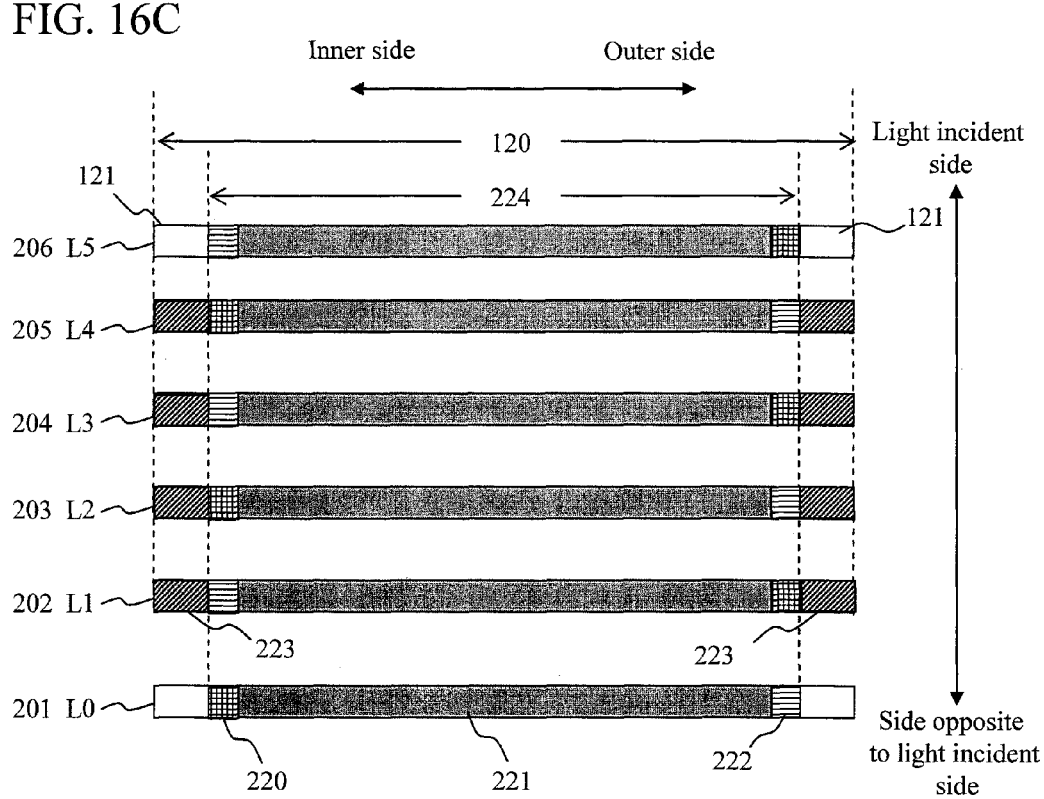

MULTILAYER OPTICAL RECORDING MEDIUM HAVING THREE OR MORE RECORDING LAYERS WITH REDUCED INTERLAYER CROSSTALK

CLAIMS OF PRIORITY

The present application claims priority from Japanese patent application JP 2008-103361 filed on Apr. 11, 2008, the content of which is hereby incorporated by reference into this application.

BACKGROUND OF THE INVENTION

1. Field of the Invention

The present invention relates to a multilayer optical recording medium having three or more recording layers with less interlayer crosstalk generated.

2. Description of the Related Art

FIG. 1A shows a cross-sectional structure of a conventionally known multilayer optical disk among optical recording media, and schematically shows the principle for selectively recording and reproducing information of each recording layer. In the example of FIG. 1A, the recording medium includes a total of six layers having information recorded thereon (hereafter referred to as recording layers), and these six layers are referred respectively to as a first recording layer 101, a second recording layer 102, a third recording layer 103, a fourth recording layer 104, a fifth recording layer 105, and a sixth recording layer 106 in the order starting from a side opposite to the side where the irradiation light is incident on the optical disk, i.e., from the bottom side in FIG. 1A. For accessing recorded information, for example, on the third recording layer 103 by using this six-layer medium, the position of an objective lens is controlled in an optical recording and reproducing apparatus so that an optical spot 107 is positioned on the third recording layer 103. At that time, focused light 108 while being narrowed down by the objective lens transmits through the sixth recording layer 106, the fifth recording layer 105, and the fourth recording layer 104 that are semitransparent. On the sixth, fifth and fourth recording layers, the beam diameter of the focused light 108 is sufficiently larger than the diameter of the optical spot 107 on the third recording layer 103. Therefore, recording information on the sixth, fifth, and fourth recording layers 106, 105, and 104 that are semitransparent cannot be resolved and reproduced. In addition, the light intensity per unit area is relatively small since the beam diameter is large on the sixth, fifth, and fourth recording layers 106, 105, and 104 that are semitransparent. Accordingly, there is no risk of destroying information on the sixth, fifth, and fourth recording layers 106, 105, and 104 at the time of recording information. In this way, information recording and reproducing on the third recording layer located far from the incident side of the irradiation light are achieved without being influenced by the sixth, fifth, and fourth recording layers. Information recording and reproducing on other recording layers are conducted in the same way by controlling the position of the objective lens. Conditions for thus conducting recording and reproducing information on an optical recording medium having multiple recording layers without any influence upon other layers are described in detail in Japanese Patent Application Publication No. Hei 5-101398.

In reproduction of the multilayer optical disc, problems arise due to the effect of the light attenuation in recording layers located in front of a target recording layer seen from the irradiation light incident side (hereinafter, "in front of" means the same as here), and also of an influence caused by multiple reflection of light in recording layers located in front of the target recording layer for the recording and reproducing information. How the multiple-reflected light adversely affects information recording and reproducing will be described with reference to FIG. 2. Hereinbelow, the target recording layer of recording and reproducing information is represented as an n-th layer. Incident light 108 formed of focused light is emitted so as to form an optical spot 107 on the n-th layer as shown in FIG. 2. At this time, light reflected by the (n+1)th layer located right in front of the target recording layer becomes unnecessary light 402. After arriving at the back surface of the (n+2)th layer and being reflected by the back surface of the (n+2)th layer, the unnecessary light 402 might be reflected by the (n+1)th layer again, follow nearly the same path of light reflected by the n-th layer, and be detected as if it is light reflected by the n-th layer. In this case, large interlayer crosstalk is generated. In the present specification, "crosstalk" means "interlayer crosstalk." It is pointed out in Japanese Journal of Applied Physics, Vol. 43, No. 7B, 2004, pp. 4983-4986 and Ushiyama et. al., Tech. Digest of ODS2006, WDPDP3 that detection of such unnecessary light poses a big problem.

For this reason, as the method of reducing the interlayer crosstalk, Japanese Journal of Applied Physics, Vol. 43, No. 7B, 2004, pp. 4983-4986 discloses an example of a multilayer medium having its interlayer distance changed, and Japanese Patent Application Publication Nos. 2006-48811 and 2007-220150 disclose examples of a multilayer medium having its reflectivity controlled by devising layers that are stacked on a recording layer.

SUMMARY OF THE INVENTION

As described above, the interlayer crosstalk due to the unnecessary light spot poses a problem in the design of a multilayer optical recording medium. Since the unnecessary light focuses on the (n+2)th layer and becomes an unnecessary light spot, information on the (n+2)th layer can be optically resolved. As a result the unnecessary light cannot be separated so the influence of the unnecessary light cannot be removed because the bandwidth of the unnecessary light overlaps with that of an ordinary optical recording and reproducing signal. Moreover, since returned light, that is the unnecessary light, follows nearly the same path as that of the light reflected off the n-th layer and is detected as if it is the light reflected off the n-th layer. Accordingly, also on a detector, the unnecessary light completely overlaps with the original light reflected off the n-th layer. The fact that light cannot be separated on the detector means that it is difficult for an optical system to remove an influence of the interlayer crosstalk due to the unnecessary light. To address this problem, provided are a method of changing the interlayer distance in a multilayer medium, and a method of controlling the reflectivity by devising the layers that are stacked on the recording layer. However, as shown in the schematic cross section of FIG. 1B, in the conventional multilayer optical recording medium, each of recording layers 101 to 106 has not only an information recording area 224, but also a flat area 121 formed therein, the information recording area 224 having unevennesses such as tracking grooves or pits, the flat area 121 having no unevenness being located in the innermost periphery portion and the outermost periphery portion. Study by the present inventors revealed that the influence of interlayer crosstalk cannot be completely removed with only the conventional methods. Note that, the information recording area 224 consists of a data area 221, a lead-in area 220, and a lead-out area 222.

It is an object to the present invention to provide a method for reducing an influence of interlayer crosstalk generated in a multilayer optical recording medium having three or more recording layers, and a multilayer optical recording medium in which the interlayer crosstalk is less generated.

A multilayer optical recording medium of the present invention has at least three recording layers, each of the recording layers includes an information recording area, and the recording layers other than the nearest recording layer and the farthest recording layer when viewed from a light incident side include a first annular area having uneven patterns formed thereon, and a second annular area having uneven patterns formed thereon, the first annular area being adjacent to an inner side of the information recording area, the second annular area being adjacent to an outer side of the information recording area. This makes it possible to reduce an influence of an unnecessary light spot generated in the multilayer optical recording medium having at least three recording layers.

Moreover, each of the recording layers includes an information recording area, and flat areas without unevennesses arranged on an inner side and outer side of the information recording area, and furthermore the recording layers other than the nearest recording layer and the farthest recording layer when viewed from a light incident side include a first annular area having an uneven pattern formed thereon, and a second annular area having an uneven pattern formed thereon, the first annular area being adjacent to an inner side of the information recording area, the second annular area being adjacent to an outer side of the information recording area. This makes it possible to reduce an influence of an unnecessary light spot generated in the multilayer optical recording medium having at least three recording layers.

An area obtained by joining the information recording area of a first one of the recording layers and the first and second annular areas covers an area wider than the information recording area of a second one of the recording layers next to the first one of the recording layers when viewed from the light incident side. In other words, paying attention to the information recording area of each of the recording layers, and in particular, to its inner peripheral edge and its outer peripheral edge, the corresponding area in the first recording layer located on the light incident side of the second recording layer is not a flat area without unevennesses but an area having an uneven pattern formed thereon.

Moreover, the uneven patterns formed in the first and second annular areas are formed so as to have a flat area made between the uneven patterns smaller in size than an optical spot.

Each of the uneven patterns formed in the first and second annular areas includes, when a diameter of the optical spot is represented by D, combinations of a pit having a length no less than D/4 and less than 3D/8, a pit having a length no less than 3D/8 and less than D/2, a pit having a length no less than D/2 and less than D, and a pit having a length no less than D, and the uneven pattern differs from an uneven pattern in a data area.

This allows the first and second annular areas to reduce interlayer crosstalk due to an unnecessary light spot generated in the multilayer optical recording medium having at least three recording layers. Additionally, the first and second annular areas can be used to optimize the reproduction condition of an optical system, thereby improving the signal quality at the time of reproduction.

The present invention can reduce interlayer crosstalk, which would otherwise be generated due to an unnecessary light spot in a multilayer optical recording medium having multiple recording layers. Moreover, the present invention can be combined with the conventional method so as to provide a high-performance multilayer optical recording medium in which interlayer crosstalk is less generated.

BRIEF DESCRIPTION OF THE DRAWINGS

FIGS. 16A to 16C are views showing an example of the structure of an alternative multilayer optical recording medium of the present invention.

DESCRIPTION OF THE PREFERRED EMBODIMENTS

Hereinafter, embodiments of the present invention will be described below with reference to the accompanying drawings.

Embodiment 1

Figure 3A:
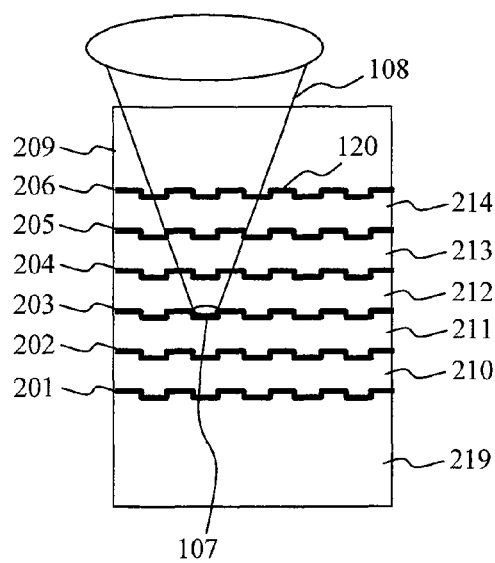
FIGS. 3A to 3C are views each showing an example of the structure of a multilayer optical recording medium of the present invention.

FIG. 3A schematically shows a cross-sectional structure of a multilayer recording medium according to an embodiment of the present invention. Here, a multilayer recording medium having six recording layers is taken as an example. The multilayer recording medium includes a substrate 219, a first recording layer (L0) 201, a second recording layer (L1) 202, a third recording layer (L2) 203, a fourth recording layer (L3) 204, a fifth recording layer (L4) 205, and a sixth recording layer (L5) 206 in this order from the side opposite to the light incident side at the time of irradiation of light. The layer thickness of interlayer materials 210, 211, 212, 213, and 214 between the corresponding recording layers is approximately 10 μm. On top of the interlayer materials, a cover layer 209 of approximately 50 μm in thickness is formed. The focused light 108 is emitted from the incident plane side, and the optical spot 107 is formed on one of the recording layers.

Figure 3B:
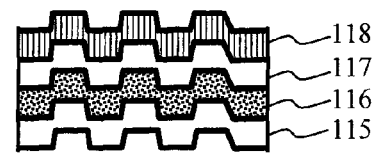

In a recordable-type multilayer optical recording medium, each of the recording layers is typically formed of a reflective film 115, a protective film 116, a recording film 117, and a protective film 118 as shown in FIG. 3B, however, other configurations may be employed. In other words, each of the recording layers may include a film other than the above-described films, or each of the recording layers may not include the protective film, for example. An example is shown here in which different recording layers have the same film configuration. However, the film configuration may differ for each of the recording layers or the material or the thickness of each of the films may differ.

Figure 3C:
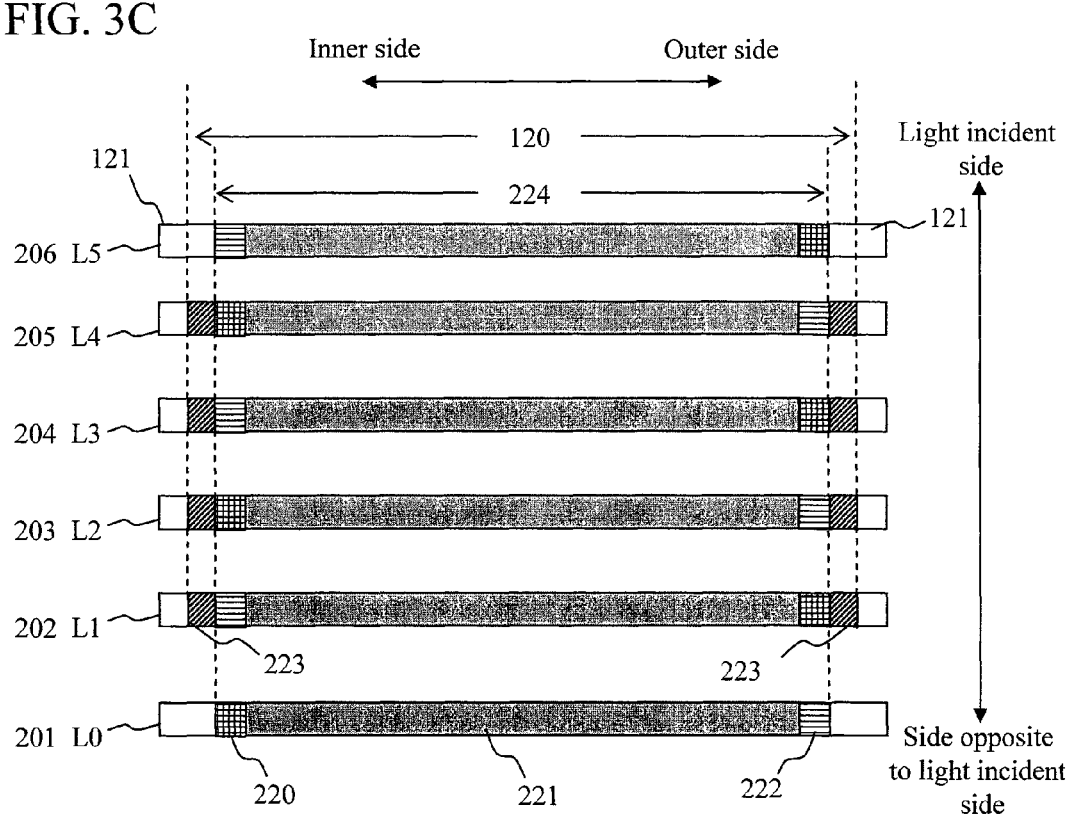

FIG. 3C shows a layout of this medium cross-sectioned in the radial direction. In the embodiment of the present invention, prevention areas of ghost signal 223 are formed in the second recording layer when counted from the light incident side through the second recording layer when counted from the side opposite to the light incident side, i.e., from L4 to L1. In the prevention area of ghost signal, grooves with a pitch of 0.3 μm, a width of 0.14 μm, and a depth of 25 nm are formed without any space therebetween. The ghost signal prevention area 223 is formed between the flat area 121 without unevennesses and the information recording area 224 that includes the data area 221 and the areas, such as the lead-in area 220 and the lead-out area 222, having information other than data. Thereby, the ghost signal prevention area 223 keeps the information recording area 224 and the flat area 121 away from each other in the in-plane direction, and is thus effective in making the interlayer crosstalk less generated. In this embodiment, the width of the circular ghost signal prevention area on an inner side and the width of the circular ghost signal prevention area on an outer side are set to 200 μm, respectively. Since a recordable-type multilayer information recording medium is assumed in this embodiment, grooves are formed in the data area 221 so that data can be recorded along a track. However, the technique of the present invention can be effectively applied to both a recordable-type multilayer information recording medium and a read-only (ROM type) medium having pits formed in the data area. Here, the area, such as the information recording area or the prevention area of ghost signal, having unevennesses formed thereon is referred to as a pattern area 120 and distinguished from the flat area 121 without unevennesses.

When reproduction was performed at a linear velocity of 5 m/s using a recording and reproducing apparatus having an optical system with a laser wavelength of 400 nm and a lens of NA 0.85, a signal variation M in each of the recording layers was measured as an index of the interlayer crosstalk. The results thereof are summarized in Table 1. The details of the apparatus will be described in Embodiment 4.

$$M=2(IH-IL)/(IH+IL) \quad (1)$$

Figure 4A:
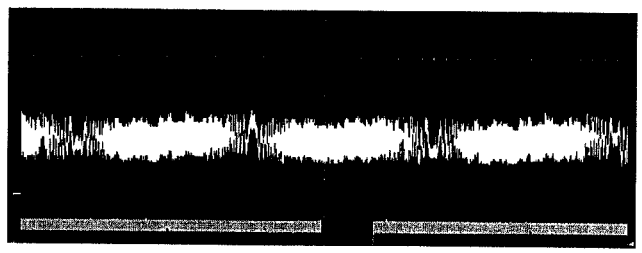
FIGS. 4A and 4B are views showing a readout signal in the multilayer optical recording medium of the present invention.
Figure 4B:
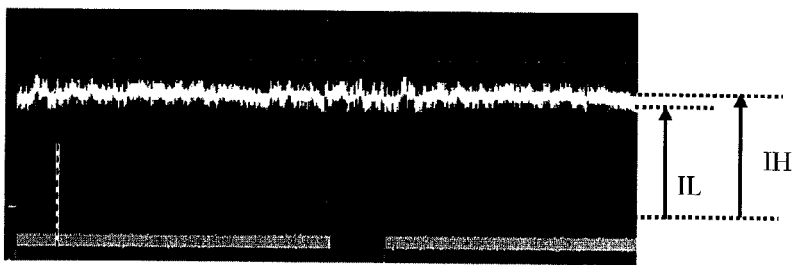

In the equation, IH is the maximum value of reflectivity and IL is the minimum value of reflectivity (see FIGS. 4A and 4B). FIG. 4A shows a readout signal obtained when the laser beam is focused on L4 and the tracking control is not executed. FIG. 4B shows a readout signal obtained when the laser beam is focused on L3 and the tracking control is executed. Comparison can be made on the optical spots moving across the same position in the plane between in FIGS. 4A and 4B.

In Table 1, a readout layer refers to a recording layer during reproduction. The farther the readout layer is spaced apart from the light incident side, the larger the influence of crosstalk due to an unnecessary light spot becomes. For this reason, the closer to the side opposite to the light incident side the readout layer comes, the larger the signal variation becomes. In spite of this fact, in the medium of this embodiment, the signal variation can be reduced to 0.21 at maximum. From this result, a multilayer optical recording medium can be provided in which an influence of interlayer crosstalk due to an unnecessary light spot is less generated.

TABLE 1

| readout layer | signal variation M |
| --- | --- |
| first recording layer (L0) | 0.21 |
| second recording layer (L1) | 0.15 |
| third recording layer (L2) | 0.14 |
| fourth recording layer (L3) | 0.12 |
| fifth recording layer (L4) | 0.11 |
| sixth recording layer (L5) | 0.10 |

Note that, the configuration of the apparatus, the reproduction method, and the like, which are not described in this embodiment, are the same as those of Embodiments 2 to 5.

Comparative Example 1

Figure 1A:
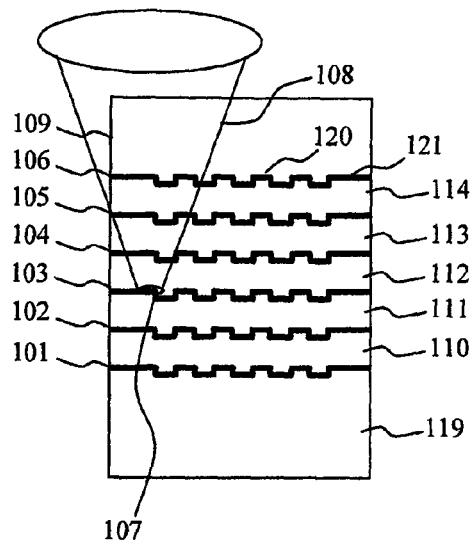
FIGS. 1A and 1B are views each showing a structure of a conventional multilayer optical recording medium.
Figure 1B:
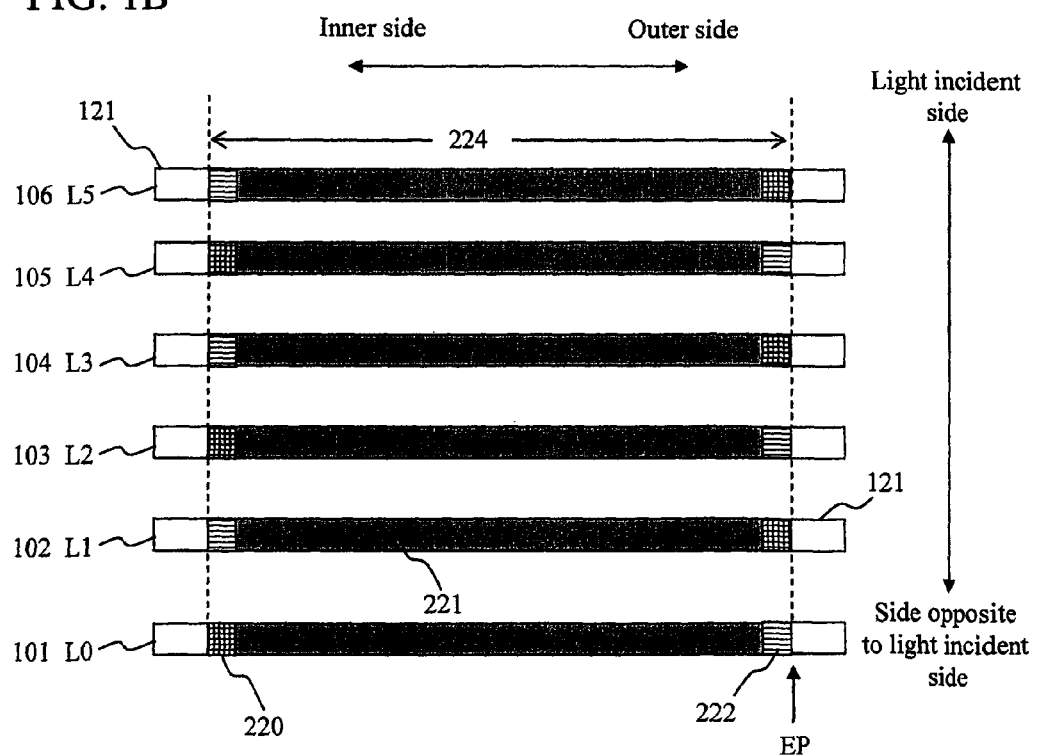
Figure 2:
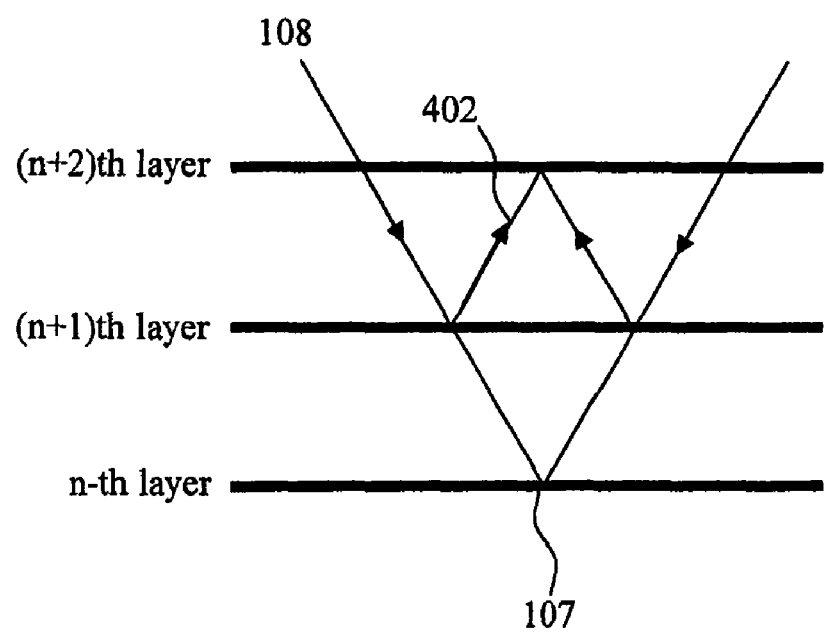
FIG. 2 is a view illustrating a problem in a multilayer optical recording medium having at least three layers.

For comparison with the above-described Embodiment 1, a multilayer optical recording medium without the ghost signal prevention area was prepared. The other configurations, specifically, the interlayer distance, the quality of the material, the material for the recording layer, the layer thickness, the recording and reproducing apparatus, and the like are the same as those of Embodiment 1. FIG. 1B shows a layout of the thus prepared multilayer optical recording medium of the comparative example cross-sectioned in the radial direction. This medium is formed in which the information recording area 224 and the flat area 121 without unevennesses in L1 to L4 are adjacent to each other in the radial direction. For this reason, the evaluation results of a readout signal at an evaluation point EP in FIG. 1B showed that the signal variation M in the medium of the comparative example is 0.63, which is extremely high as shown in FIGS. 5A and 5B.

Figure 5A:
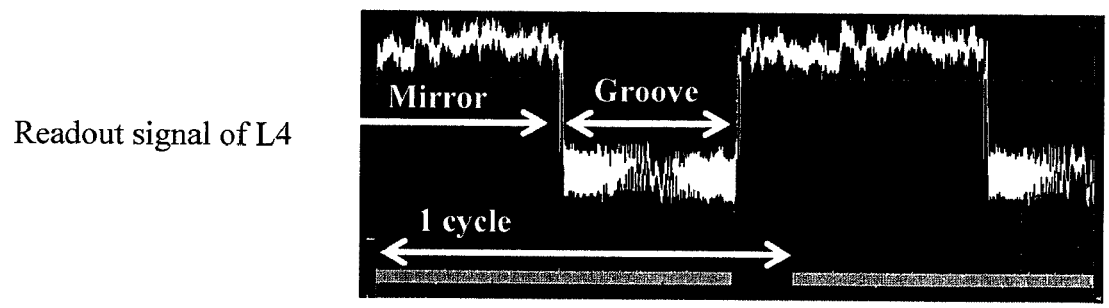
FIGS. 5A and 5B are views showing a readout signal in a multilayer optical recording medium of a comparative example.
Figure 5B:
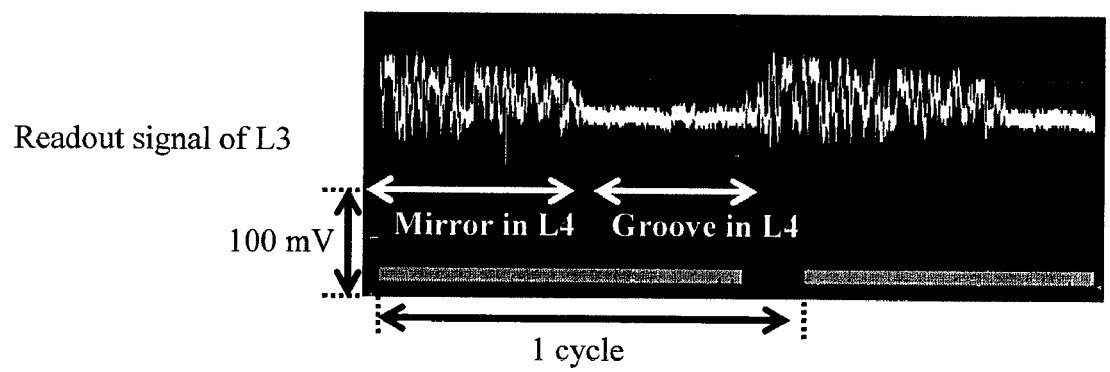

FIG. 5A shows a readout signal when the laser beam is focused on L4 and the tracking control is not executed. As can be seen in FIG. 5A, the average reflectivity is high when a spot passes across the flat area without unevennesses, while the average reflectivity is low when the spot passes across an area having an uneven pattern such as a groove formed thereon. FIG. 5B shows a readout signal when the laser beam is focused on L3 and the tracking control is executed. Comparison can be made on the optical spots moving across the same position in the plane between in FIGS. 5A and 5B. As can be seen in FIGS. 5A and 5B, the signal variation of L3 increases at a position where the average reflectivity of L4 is high, while the signal variation of L3 decreases at a position where the average reflectivity of L4 is low.

The measurement results of the signal variation M in the medium of the comparative example are summarized in Table 2. When the first and second recording layers are reproduced from the light incident side, interlayer crosstalk due to an unnecessary light spot is not generated and therefore almost the same results as those of the medium of Embodiment 1 were obtained. However, when the third to sixth recording layers are reproduced, interlayer crosstalk due to an unnecessary light spot is generated and therefore the signal variation was extremely large.

TABLE 2

| readout layer | signal variation M |
|---|---|
| first recording layer (L0) | 0.63 |
| second recording layer (L1) | 0.48 |
| third recording layer (L2) | 0.45 |
| fourth recording layer (L3) | 0.37 |
| fifth recording layer (L4) | 0.12 |
| sixth recording layer (L5) | 0.10 |

Figure 6A:
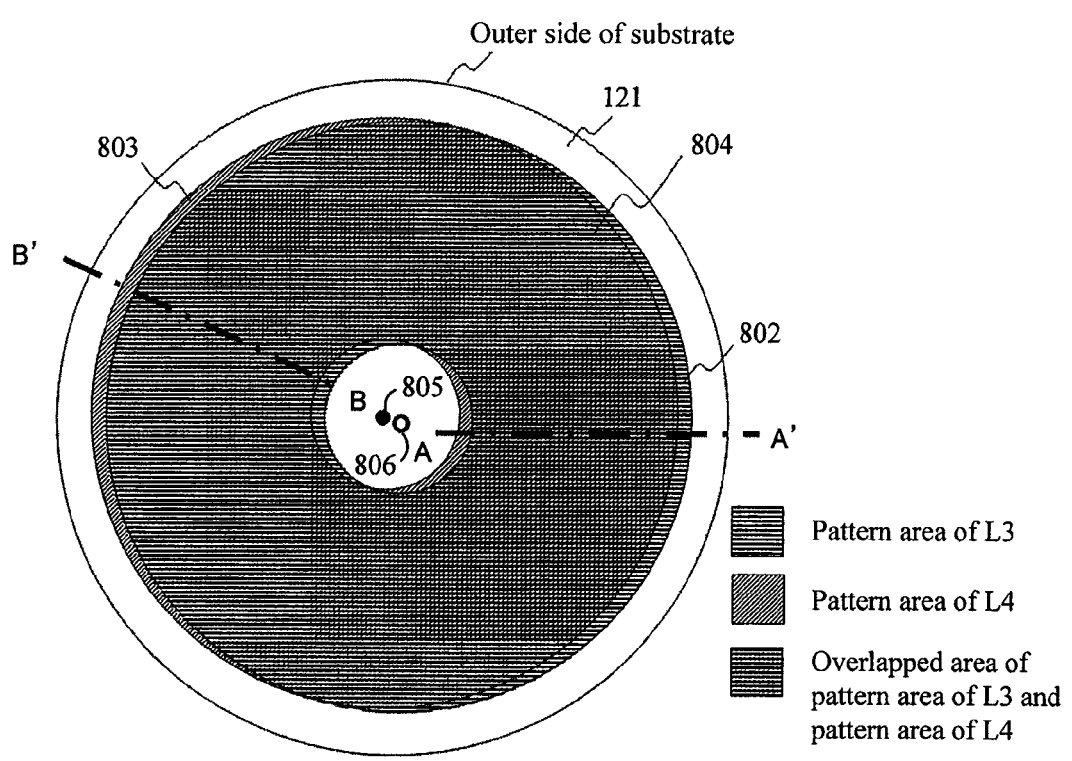
FIGS. 6A to 6C are conceptual diagrams showing displacement in a pattern area due to deviation from the center.
Figure 6B:
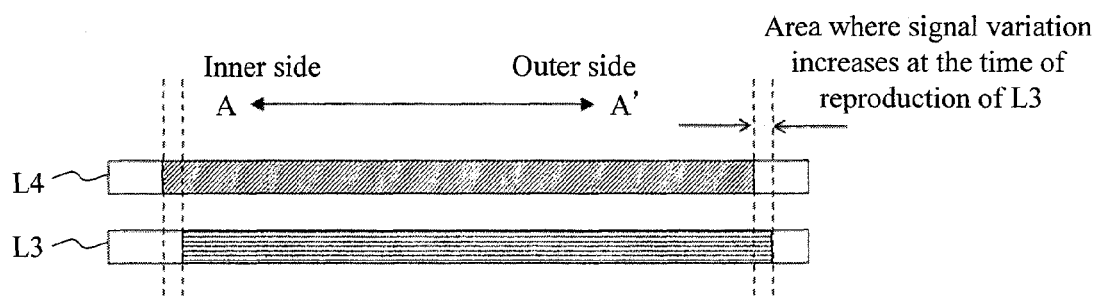
Figure 6C:
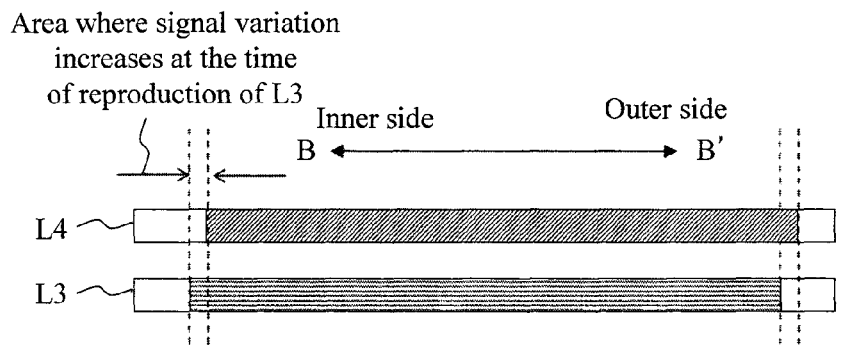

The reason why the signal variation increases at part of one cycle is because the pattern area of each of the recording layers deviates from the center. A conceptual diagram illustrating displacements of the pattern areas due to deviations from the center is shown in FIGS. 6A to 6C. FIG. 6A is a plan view, FIG. 6B is a cross sectional view taken along the A-A' line of FIG. 6A, and FIG. 6C is a cross sectional view taken along the B-B' line of FIG. 6A. Here the fourth recording layer (L3) and the fifth recording layer (L4) are taken as examples, but similar results can be obtained using any other combination of other layers. Since the center 806 of L3 and the center 805 of L4 deviate from each other as shown in FIG. 6A, a pattern area 802 of L3 and a pattern area 803 of L4 also deviate from each other. For this reason, when the optical spot passes across the area 804 in which the pattern area of L3 and the pattern area of L4 overlap with each other and the area 803 in which these pattern areas do not overlap with each other, a part where the signal variation is small and a part where the signal variation is large are generated as shown in FIGS. 5A and 5B. In other words, as schematically shown in FIGS. 6B and 6C, at the time of reproduction of L3, the signal variation increases when the area of L4 on a readout track is not the pattern area with an unevenness but the flat area without unevennesses.

Embodiment 2

Figure 7:
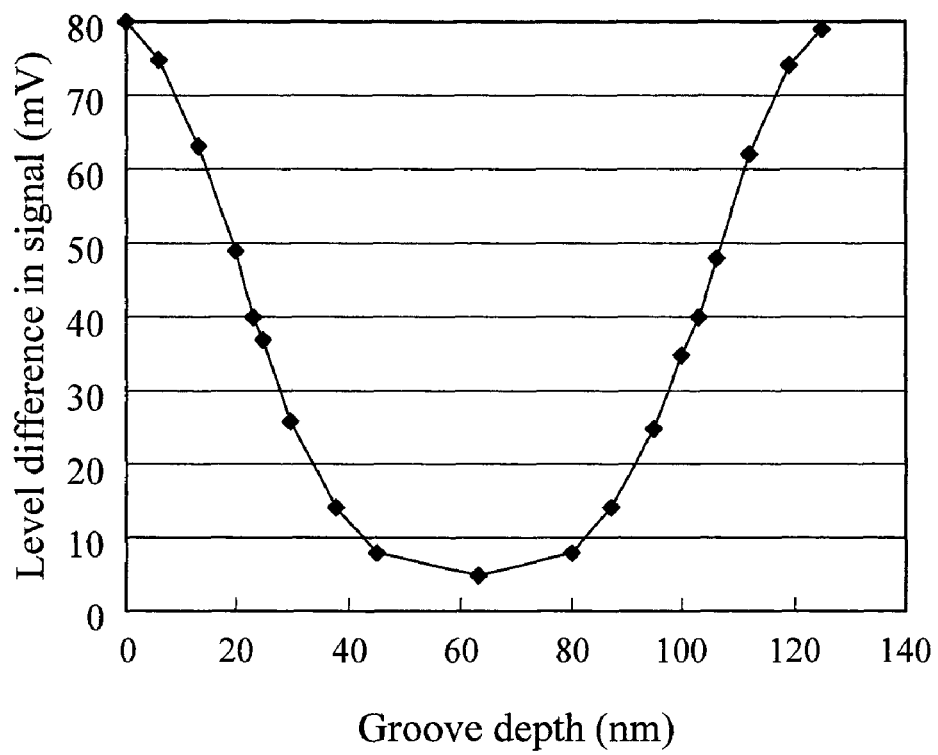
FIG. 7 is a view showing a relationship between the groove depth and the level difference of a signal that varies due to interlayer crosstalk.

Multilayer optical recording media which are similar to that in Embodiment 1 but have the depth of an uneven portion of the ghost signal prevention area changed were prepared to examine a relationship between the depth of the uneven portion of the ghost signal prevention area and the crosstalk suppression effect. The results were summarized in FIG. 7 and Table 3. Here, a signal level difference P in each groove depth was measured.

$$P = IH - IL \quad (2)$$

Figure 8A:
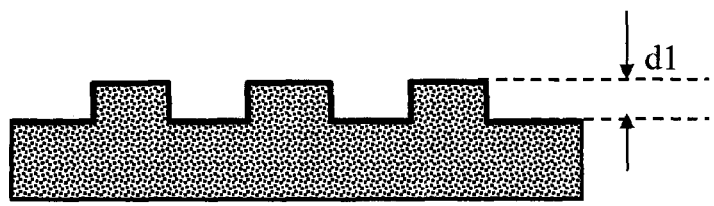
FIGS. 8A to 8F are cross sectional views of prevention areas of ghost signal.

First, a groove-like uneven portion as shown in FIG. 8A was examined. The groove depth corresponds to d1. The groove depth of 0 nm corresponds to a flat state without unevennesses.

TABLE 3

| groove depth (nm) | signal level difference P (mV) |
|---|---|
| 0 | 80 |
| 6 | 75 |
| 13 | 63 |
| 20 | 49 |
| 23 | 40 |
| 25 | 37 |
| 30 | 26 |

TABLE 3-continued

| groove depth (nm) | signal level difference P (mV) |
|---|---|
| 38 | 14 |
| 45 | 8 |
| 63 | 5 |
| 80 | 8 |
| 87 | 14 |
| 95 | 25 |
| 100 | 35 |
| 103 | 40 |
| 106 | 48 |
| 112 | 62 |
| 119 | 74 |
| 124 | 79 |

As can be seen from the above, formation of grooves in the ghost signal prevention area suppresses the generation of crosstalk due to an unnecessary light spot and reduces the signal variation, so that the signal level difference P can be suppressed. In this way, even with a shallow unevenness of 6 nm, the formation of the unevenness exerts a crosstalk suppression effect. Furthermore, the groove depth no less than 23 nm and no more than 103 nm would be preferable because the signal level difference can be reduced by half, and the groove depth no less than 30 nm and no more than 95 nm would be more preferable. In other words, when the wavelength is denoted as λ and the refractive index of the substrate or the unevenness constituent material is denoted as n, the preferable groove depth is less than λ/11 n and no more than λ/2.4 n and the more preferable groove depth is less than λ/8.3 n and no more than λ/2.6 n.

Figure 8B:
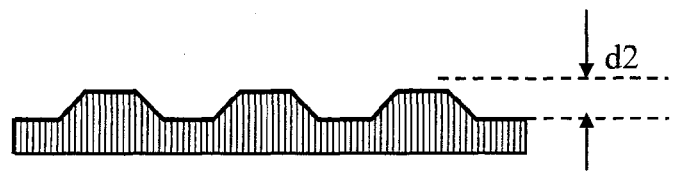
Figure 8C:
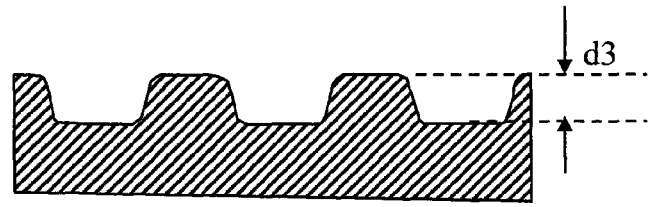
Figure 8D:
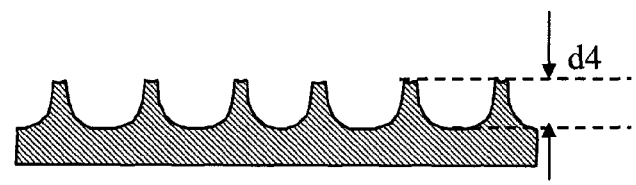
Figure 8E:
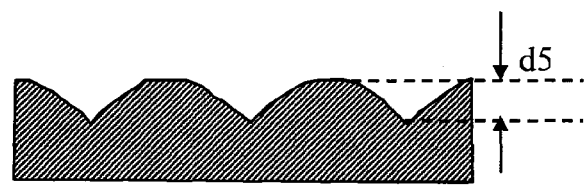
Figure 8F:
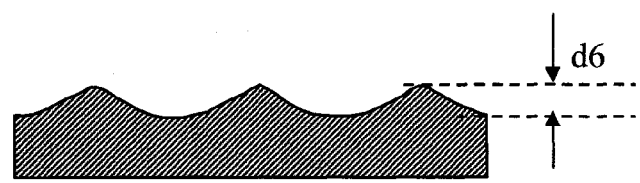

Moreover, even though the groove slope is not nearly vertical as shown in FIG. 8A but is inclined (FIG. 8B), a similar crosstalk suppression effect was observed. Other than this, even in each of the cases where a groove has round corners (FIG. 8C), a rounded bottom (FIG. 8D, FIG. 8F), a pointed bottom (FIG. 8E), and a very-narrow flat area (FIG. 8F), a crosstalk suppression effect nearly the above-described one is observed. In the cases of the respective shapes, the dimensions corresponding to the groove depth are d2, d3, d4, d5, and d6 in the FIGS. 8A to 8F.

Note that, the configuration of the apparatus, the reproduction method, and the like, which are not described in this embodiment, are the same as those of Embodiments 1, and 3 to 5.

Embodiment 3

Figure 9A:
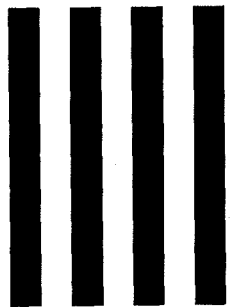
FIGS. 9A to 9F are plan views of the ghost signal prevention area in groove-like shapes.
Figure 9B:
Figure 9C:
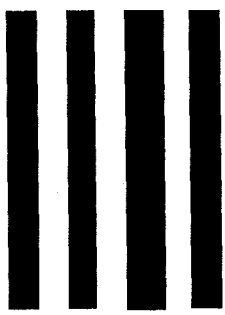
Figure 9D:
Figure 9E:
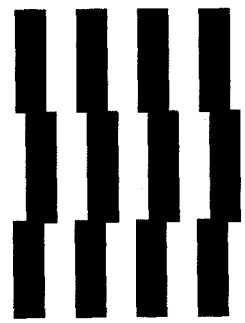
Figure 9F:
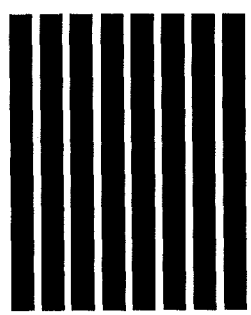
Figure 10A:
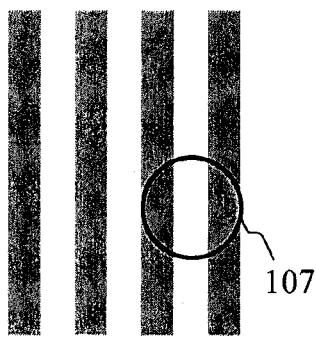
FIGS. 10A to 10D are views showing a relationship between the size of an unevenness and the spot size in the prevention area of ghost signal.
Figure 10B:
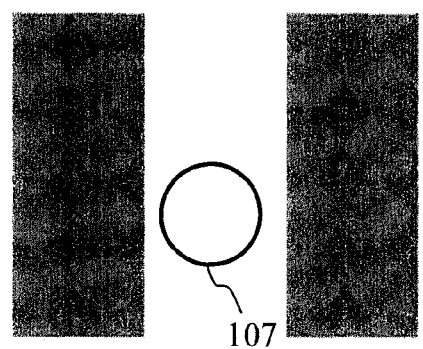
Figure 10C:
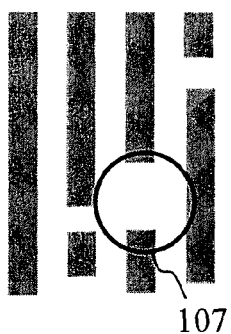
Figure 10D:
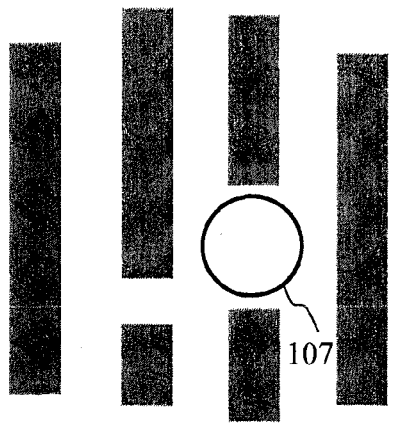

Multilayer optical recording media which are similar to that in Embodiment 1 but have the shape in the in-plane direction of an uneven portion of the ghost signal prevention area were prepared to examine a relationship between the shape of the uneven portion of the ghost signal prevention area and the crosstalk suppression effect. First, other than the groove-like uneven portion as shown in FIG. 9A that is employed in Embodiment 1, examinations were made on cases where a shape has grooves occasionally broken (FIG. 9B), grooves with irregular widths and intervals (FIG. 9C), grooves aligned with ununiform angles (FIG. 9D), positions of grooves misaligned (FIG. 9E), and grooves with narrow intervals (FIG. 9F). In each of these cases, the same crosstalk suppression effect as that of Embodiment 1 was observed when both of the groove portion and the flat area without unevennesses come in the optical spot as shown in FIG. 10A and FIG. 10C. On the other hand, when the groove interval or groove size is too large so that the optical spot comes in between grooves as shown in FIG. 10B and FIG. 10D, the interlayer crosstalk suppression effect decreased. This is because the interlayer crosstalk increases in a local area since a flat area without unevennesses partially exists. For this reason, the signal variation increased locally.

Figure 11A:
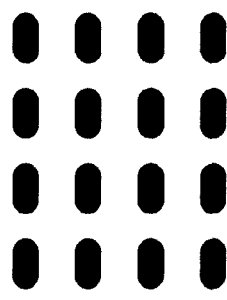
FIGS. 11A to 11F are plan views of the ghost signal prevention area in isolated shapes.
Figure 11B:
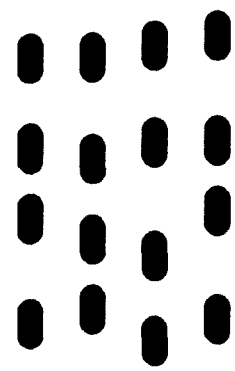
Figure 11C:
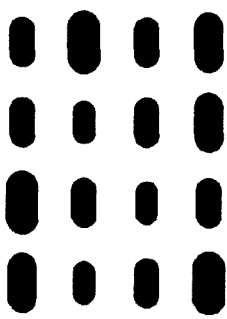
Figure 11D:
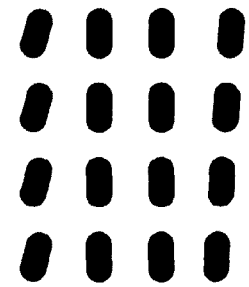
Figure 11E:
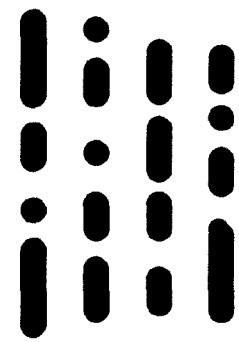
Figure 11F:
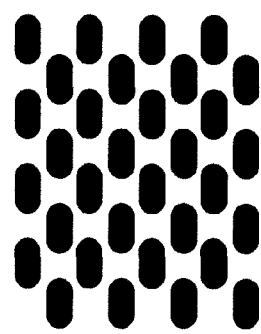
Figure 12A:
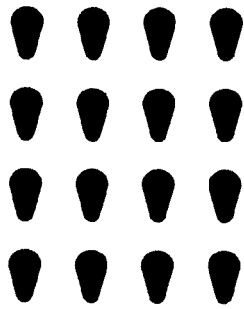
FIGS. 12A to 12G are views showing other examples of the ghost signal prevention area in isolated shapes.
Figure 12B:
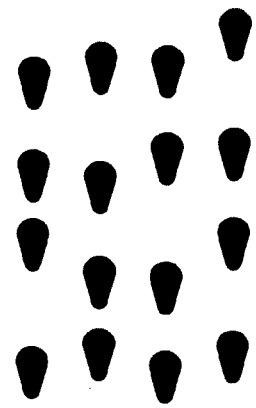
Figure 12C:
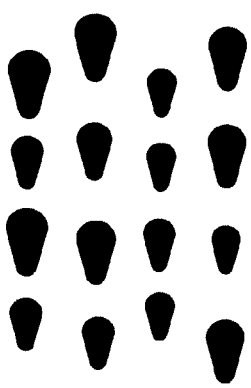
Figure 12D:
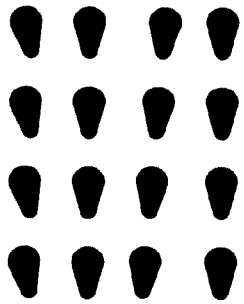
Figure 12E:
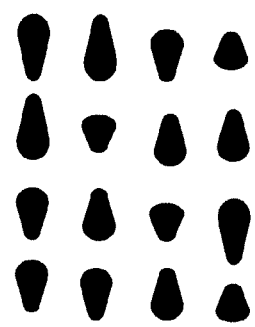
Figure 12F:
Figure 12G:
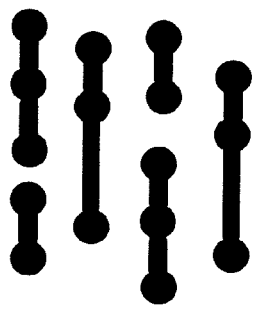

Other than the above, the shapes of the unevenness other than the groove were examined as well. The interlayer crosstalk suppression effect was observed even in a pattern consisting of a combination of oblong shapes as shown in FIGS. 11A to 11F or a combination of teardrop shapes as shown in FIGS. 12A to 12G. The combinations of oblong shapes or teardrop shapes in the following cases show the interlayer crosstalk suppression effect. Specifically, a case where the oblong shapes or the teardrop shapes are regularly arranged as shown in FIG. 11A or FIG. 12A, a case where the intervals between the oblong shapes or between teardrop shapes are ununiform as shown in FIG. 11B or FIG. 12B, a case where the sizes of the oblong shapes or teardrop shapes are uneven as shown in FIG. 11C or FIG. 12C, a case where the orientations of the oblong shapes or teardrop shapes are inclined as shown in FIG. 11D or FIG. 12D, a case where the oblong shape or teardrop shapes having different lengths are combined as shown in FIG. 11E or FIG. 12E, and a case where the density of an unevenness is very high as shown in FIG. 11F or FIG. 12F. Further, the oblong shape includes a shape whose entire shape is almost oblong even if whose arc has a slight unevenness and distortion or whose straight line portion is distorted as shown in FIG. 12G.

Figure 13A:
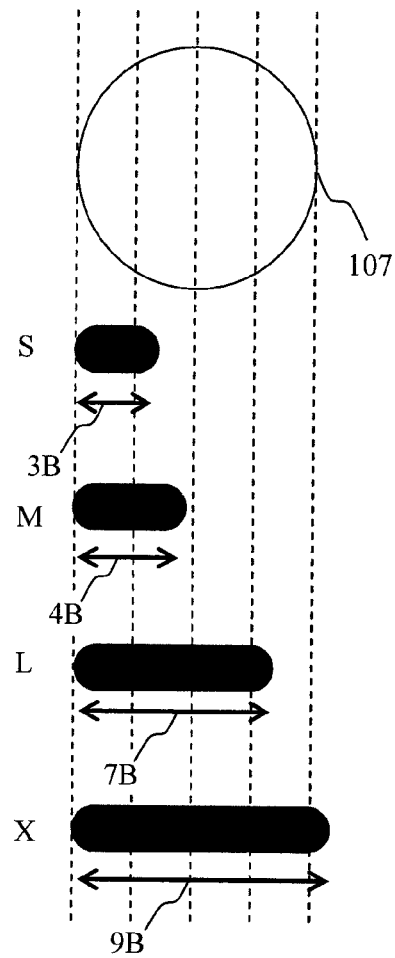
FIGS. 13A to 13C are views showing other examples of the prevention area of ghost signal.

Furthermore, the ghost signal prevention area can contribute not only to reduction in the interlayer crosstalk due to an unnecessary light spot generated in the multilayer optical recording medium having at least three recording layers, but also to an improvement in the signal quality of a readout signal in the following case. Specifically, as shown in FIG. 11E, in a case where, the diameter of the optical spot is denoted by D, as shown in FIG. 13A, the pattern consists of a combination of the oblong shapes having different lengths, including an oblong pit S having a length no less than D/4 and less than 3D/8, an oblong pit M having a length no less than 3D/8 and less than D/2, an oblong pit L having a length no less than D/2 and less than D, and an oblong pit X having a length no less than D, and this pattern differs from the uneven pattern of the data area. The shapes of the pit also include shapes other than the oblong pit shape. Hereinafter, all the pits having various shapes are simply referred to as pits in this specification. Reference numerals 3B, 4B, 7B, and 9B in FIG. 13A refer to the length of the pit S or the space portion S, the length of the pit M or the space portion M, the length of the pit L or the space portion L, and the length of the pit X or the space portion X, respectively. This pattern group exerts its effect particularly in such a high density recording medium that the shortest mark length in the data area is less than D/4. This is because when a layer in which the ghost signal prevention area is formed is reproduced, the reproducing condition of an optical system can be optimized using the uneven pattern. Specifically, the laser spot size can be optimized by physically or electrically adjusting the distance or the gradient between a recording layer in a medium and a head, or the intensity of a laser beam in the spot can be optimized by adjusting the power level, pulse width, temperature, and the like of the laser beam.

Figure 13B:
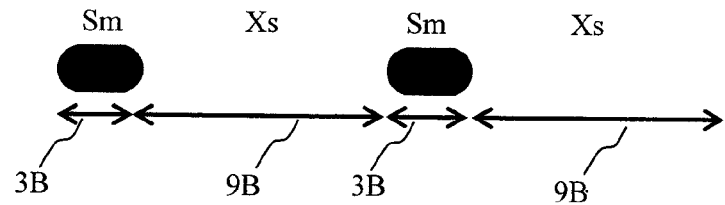
Figure 13C:
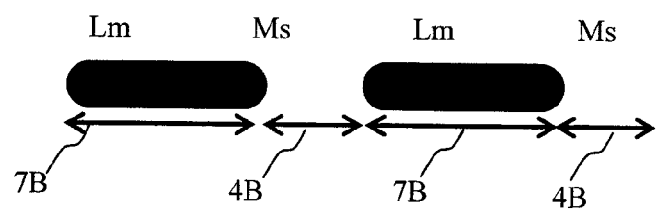

In order to improve the signal quality of a readout signal, it is preferable to have a pattern consisting of a combination of 4 sets of pit each having different length and 4 sets of space portion each having different length as follows: a pit (Sm) having a length S no less than D/4 and less than 3D/8; a pit (Mm) having a length M no less than 3D/8 and less than D/2; a pit (Lm) having a length L no less than D/2 and less than D; a pit (Xm) having a length X no less than D; and a space portion (Ss) having a length S no less than D/4 and less than 3D/8; a space portion (Ms) having a length M no less than 3D/8 and less than D/2; a space portion (Ls) having a length L no less than D/2 and less than D; and a space portion (Xs) having a length X no less than D. FIG. 13B shows, as an example, a pattern group consisting of the pit (Sm) having a length S no less than D/4 and less than 3D/8 and the space portion (Xs) having the length X no less than D, and FIG. 13C shows, as an example, a pattern group consisting of the pit (Lm) having the length L no less than D/2 and less than D and the space portion (Ms) having the length M no less than 3D/8 and less than D/2.

Figure 14:
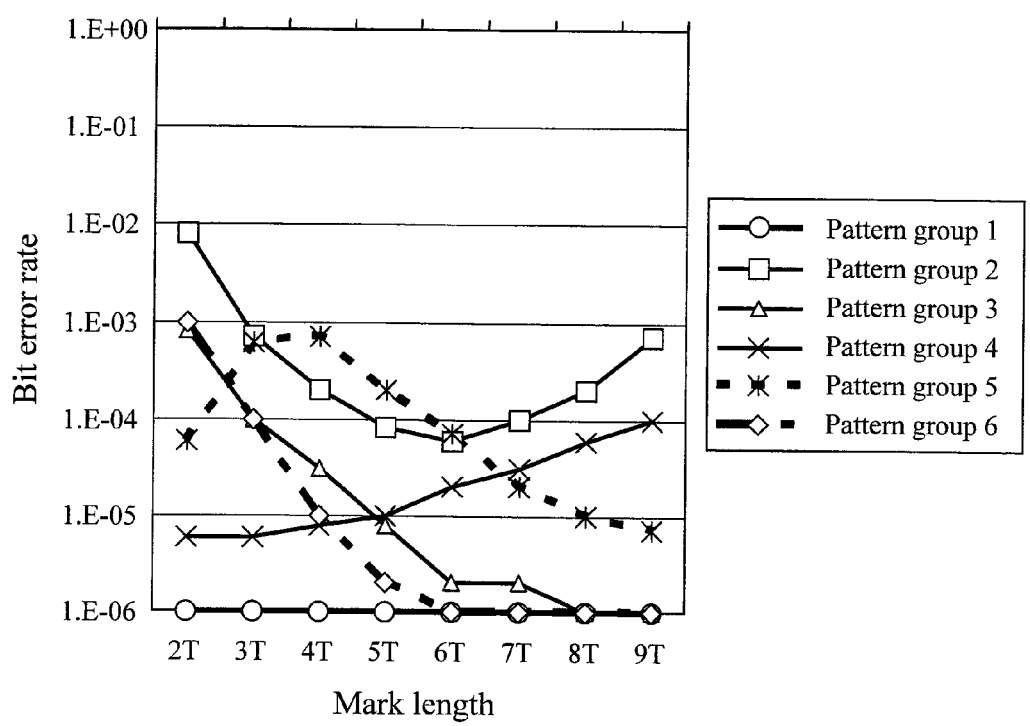
FIG. 14 is a view showing error rates of readout signals when adjustment is made using pattern groups in the prevention area of ghost signal.

FIG. 14 shows comparison results of the bit error rates of a readout signal in the data area among cases where the adjustment was made using the following uneven Pattern Groups. The pits and space portions constituting the pattern in each of Pattern Groups are as follows. For the purpose of comparison, a pit (Zm) having a length less than D/4 and a space portion (Zs) having a length less than D/4 are also included in Pattern Group 2.

Pattern Group 1: Sm (Ss), Mm (Ms), Lm (Ls), and Xm (Xs)
Pattern Group 2: Zm (Zs), Mm (Ms), and Lm (Ls)
Pattern Group 3: Mm (Ms), Lm (Ls), and Xm (Xs)
Pattern Group 4: Sm (Ss), Mm (Ms), and Lm (Ls)
Pattern Group 5: Sm (Ss) and Xm (Xs)
Pattern Group 6: Sm (Ss), Lm (Ls), and Xm (Xs)

The results show that when adjustment was made using uneven Pattern Group 1, the bit error rate of a readout signal in the data area, regardless of the mark length, can be sufficiently reduced at all the mark lengths. Such a pattern group of a set of uneven portions and a set of space portions, each set having four kinds of different lengths relative to the optical spot, has a large variation in area ratio to the spot size. Therefore, optimizing the reproducing condition of the optical system for each of all these patterns allows the signal quality at the time of reproduction to be adjusted in a well-balanced manner. A pattern group preferably includes all the patterns of unevennesses and spaces. The result of FIG. 14 shows all the conceivable patterns included. When the number of patterns decreased by half, the error rate almost doubled. When the adjustment is made using the other uneven Pattern Groups 2 to 6, the adjustment result is biased in accordance with the adjustment pattern thereby resulting in high error rates at the time of data reproduction.

Moreover, when the same pattern as that of the data area is used, the error rate is too high and the adjustment becomes difficult because the data area includes a mark with a length of D/4. Therefore, the use of a pattern different from that of the data area is preferable. Furthermore, since the ghost signal prevention area with the track pitch narrower than that of the data area would reduce the average reflectivity further, the narrower track pitch is preferable for the reduction of the interlayer crosstalk.

Note that, the configuration of the apparatus, the reproduction method, and the like, which are not described in this embodiment, are the same as those of Embodiments 1, 2, 4, and 5.

Embodiment 4

Figure 15:
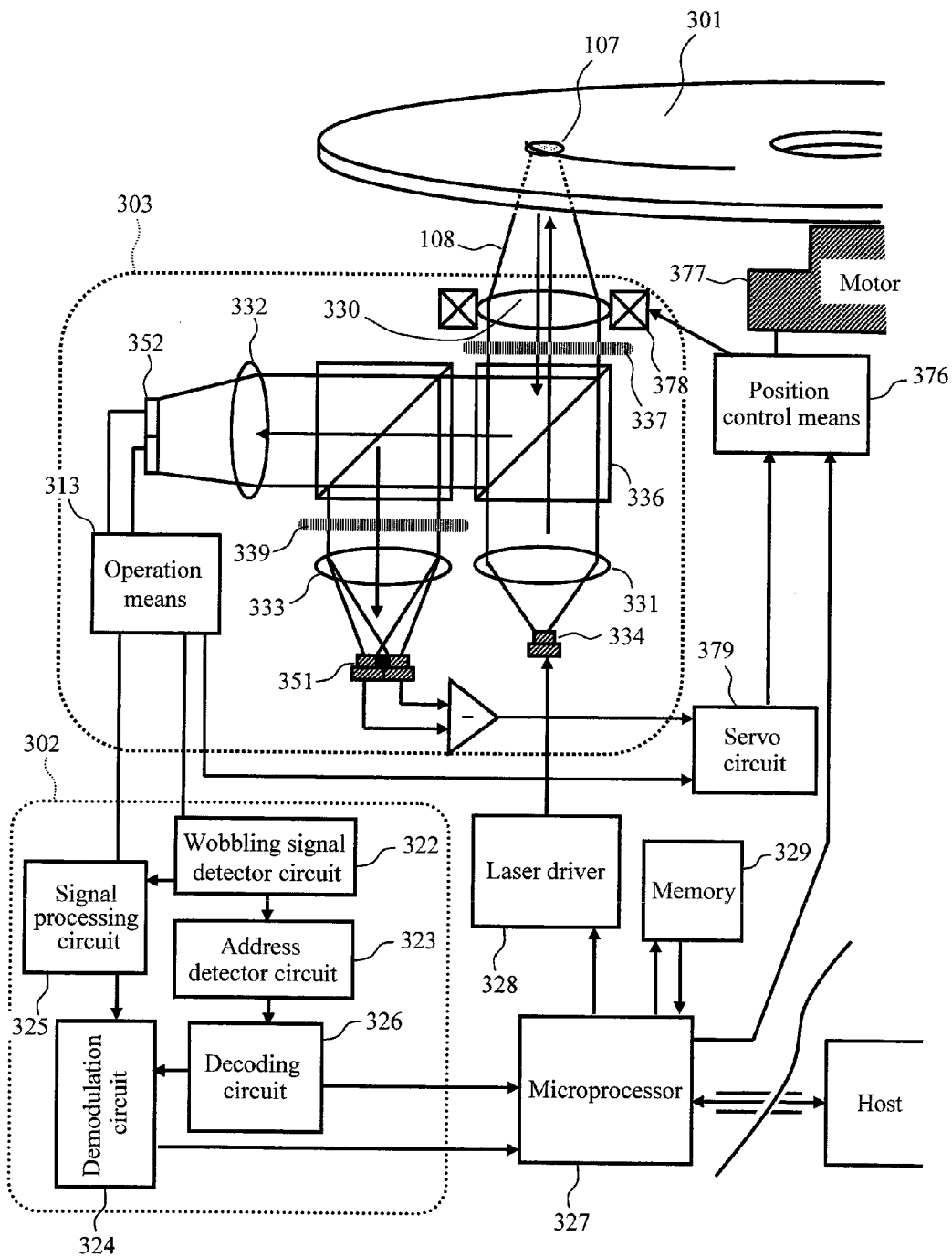
FIG. 15 is a view showing a configuration example of a multilayer optical recording and reproducing apparatus.

Next, an example of reproducing and evaluating signals of various optical disks by a recording and reproducing apparatus shown in FIG. 15 is described. Light emitted from a laser light source 334 (having a wavelength of approximately 405 nm in this embodiment) that is a part of a head 303 is collimated so as to be a nearly parallel light beam by a collimator lens 331. Information such as the laser intensity at the time of reproduction is recorded in a memory 329 in the recording and reproducing apparatus as well. Laser light is controlled by a laser driver 328 on the basis of information such as the laser intensity and timing obtained from a control circuit (microprocessor) 327. The collimated light beam transmits through a beam splitter 336, and is emitted onto an optical disk 301 as the focused light 108 through an aberration correction element 337 and an objective lens 330 to form the spot 107. A part of reflected light from the disk is led to a servo detector 351 through a beam splitter 336, a hologram element 339 that controls the plane of polarization for light, and a detection lens 333, and the other part of the reflected light is led to a signal detector 352 through the beam splitter 336 and a detection lens 332. Signals from the servo detector 351 and the signal detector 352 are subjected to addition and subtraction processing. Resulting servo signals such as a tracking error signal and a focus error signal are inputted to a servo circuit 379. On the basis of the obtained tracking error signal and focus error signal, the servo circuit 379 controls positions of an objective lens actuator 378 and the whole optical head 303 so that the optical spot 107 is positioned on a target recording and reproducing area.

An addition signal from the detector 352 is inputted to the signal processing unit 302. The input signal is subjected to filter processing, frequency equalization processing, and digitized processing by a signal processing circuit 325. Address information that is formed on the disk in the form of groove wobbles or the like is detected as a differential signal from the signal detector 352, and the differential signal is inputted to a wobbling signal detector circuit 322 in the signal processing unit 302. The wobbling signal detector circuit 322 generates a clock synchronized with a wobble signal and functions to discriminate a wobble waveform. A wobble signal detected by the wobbling signal detector circuit 322 is converted to digital information by an address detector circuit 323. Thereafter, processing such as error correction is conducted by a decoding circuit 326, and the wobble signal is detected as address information. On the basis of the detected address information, a start timing signal and the like of recording and reproducing processing are generated to be used for controlling a user data demodulation circuit 324. At the same time, the address information is transmitted to the control circuit (microprocessor) 327 as well to be used for access control, for example. Note that an operation means 313 performs calculation of input signals detected by the signal detector 352. A position control means 376 performs the rotation control of a motor 377 and the position control of the head.

In the above Embodiments 1 to 3, a recordable-type multilayer optical recording medium has been mainly described. However, the method of reducing interlayer crosstalk, the configuration of ghost reduction area, the effect, and the like are the same also in a ROM type multilayer optical recording medium in which a recording mark is formed using a pit and the like. In the case of a ROM type multilayer optical recording medium, the layer configuration shown in FIG. 3B is changed to only include the reflective film or the reflective film and protective film, and the recording layer that produces a change in the reflectivity by irradiation of laser light is no more required.

Embodiment 5

FIG. 16A schematically shows a cross-sectional structure of a multilayer recording medium according to another embodiment of the present invention.

FIG. 16C shows a layout of this medium cross-sectioned in the radial direction. In this embodiment, the ghost signal prevention area 223 is formed in the second recording layer counted from the light incident side through the second recording layer counted from the side opposite to the light incident side, i.e., from L4 to L1. In the ghost signal prevention area 223, grooves with a pitch of 0.3 µm, a width of 0.14 µm, and a depth of 25 nm are formed without any space therebetween. This ghost signal prevention area is formed extending from an edge of an area such as a lead-in area 220 having information other than data therein to the inner end, and is also formed extending from an edge a lead-out area 222 to the outer end. Although the formation of the grooves up to the inner and outer ends is not easily completed, this is preferable in terms of reduction of crosstalk because the ghost signal prevention area 223 can be widened.

Note that, the media, the configuration of the apparatus, the reproduction method, and the like, which are not described in this embodiment, are the same as those of Embodiments 1 to 4.

| Explanation of Reference Numerals | |
|---|---|
| 101-106 | recording layer |
| 107 | optical spot |
| 108 | focused light |
| 115 | reflective film |
| 116 | protective film |
| 117 | recording layer |
| 118 | protective film |
| 119 | substrate |
| 120 | pattern area |
| 121 | flat area without unevennesses |
| 201-206 | recording layer |
| 210-214 | interlayer |
| 220 | lead-in area |
| 221 | data area |
| 222 | lead-out area |
| 223 | prevention area of ghost signal |
| 224 | information recording area |
| 301 | optical disk |
| 302 | signal processing unit |
| 303 | optical head |

What is claimed is:

1. A multilayer optical recording medium comprising:
at least three recording layers,
wherein each of the recording layers includes an information recording area,
wherein the recording layers other than a nearest recording layer and a furthest recording layer, when viewed from a light incident side, each include a first annular area having uneven patterns formed thereon and a second annular area having uneven patterns formed thereon, with the first annular area being adjacent to an inner side of the information recording area, and the second annular area being adjacent to an outer side of the information recording area, and
wherein the recording layers other than the nearest recording layer and the furthest recording layer, when viewed from the light incident side, each include the first annular area, a lead-in area, a data area, a lead-out area, and the second annular area which are disposed radially in order from an inner side of the multilayer optical recording medium towards an outer side of the multilayer optical recording medium.

2. The multilayer optical recording medium according to claim 1, wherein an area obtained by joining the information recording area of a first one of the recording layers and respective first and second annular areas covers an area which is wider than the information recording area of a second one of the recording layers which is adjacent to the first one of the recording layers when viewed from the light incident side.

3. The multilayer optical recording medium according to claim 1, wherein the uneven patterns of the first and second annular areas are formed so as to have a flat area made between the uneven patterns smaller in size than an optical spot.

4. The multilayer optical recording medium according to claim 1, wherein each of the uneven patterns formed in the first and second annular areas includes, when a diameter of the optical spot is represented by D, combinations of a pit having a length no less than D/4 and less than 3D/8, a pit having a length no less than 3D/8 and less than D/2, a pit having a length no less than D/2 and less than D, and a pit having a length no less than D, and the uneven pattern differs from an uneven pattern in a data area.

5. A multilayer optical recording medium, comprising:
at least three recording layers,
wherein each of the recording layers includes an information recording area, and flat areas having an even surface are arranged on an inner side and outer side of the information recording area,
wherein the recording layers other than a nearest recording layer and a furthest recording layer, when viewed from a light incident side, include a first annular area having an uneven pattern formed thereon, and a second annular area having an uneven pattern formed thereon, with the first annular area being adjacent to an inner side of the information recording area, and the second annular area being adjacent to an outer side of the information recording area, and
wherein the recording layers other than the nearest recording layer and the furthest recording layer, when viewed from the light incident side, each include the first annular area, a lead-in area, a data area, a lead-out area, and the second annular area which are disposed radially in order from an inner side of the multilayer optical recording medium towards an outer side of the multilayer optical recording medium.

6. The multilayer optical recording medium according to claim 5, wherein an area obtained by joining the information recording area of a first one of the recording layers and respective first and second annular areas covers an area which is wider than the information recording area of a second one of the recording layers which is adjacent to the first one of the recording layers when viewed from the light incident side.

7. The multilayer optical recording medium according to claim 5, wherein the uneven patterns of the first and second annular areas are formed so as to have a flat area made between the uneven patterns smaller in size than an optical spot.

8. The multilayer optical recording medium according to claim 5, wherein each of the uneven patterns formed in the first and second annular areas includes, when a diameter of the optical spot is represented by D, combinations of a pit having a length no less than D/4 and less than 3D/8, a pit having a length no less than 3D/8 and less than D/2, a pit having a length no less than D/2 and less than D, and a pit having a length no less than D, and the uneven pattern differs from an uneven pattern in a data area.

9. The multilayer optical recording medium according to claim 1, wherein
the information recording area comprises a data area, a lead-in area on an inner side of the data area, and a lead-out area on an outer side of the data area,
the first annular area is formed adjacent to the lead-in area, and
the second annular area is formed adjacent to the lead-out area.

10. The multilayer optical recoding medium according to claim 5, wherein
the information recording area comprises the data area, in the lead-in area on an inner side of the data area, and the lead-out area on an outer side of the data area,
the first annular area is formed between the lead-in area and the flat area having the even surface, and
the second annular area is formed between the lead-out area and the flat area having the even surface.

* * * * *